(12) United States Patent
Elbaz et al.

(10) Patent No.: US 7,156,588 B2
(45) Date of Patent: Jan. 2, 2007

(54) CUTTING HEAD FOR ROTARY CUTTING TOOL

(75) Inventors: Moshe Elbaz, Nahariya (IL); Henri Shahin, Tarshiha (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 10/894,008

(22) Filed: Jul. 20, 2004

(65) Prior Publication Data

US 2005/0019118 A1   Jan. 27, 2005

(30) Foreign Application Priority Data

Jul. 21, 2003   (IL) ..................................... 157032

(51) Int. Cl.
*B23B 29/03* (2006.01)

(52) U.S. Cl. ..................... 408/190; 408/197; 408/223; 407/46

(58) Field of Classification Search ................ 408/190, 408/197, 223, 186, 189, 191, 231, 233, 713; 407/46, 50, 101, 110

See application file for complete search history.

(56) References Cited

U.S. PATENT DOCUMENTS

| | | | | |
|---|---|---|---|---|
| 2,600,651 A | * | 6/1952 | Hogg et al. ................. 408/179 |
| 3,521,507 A | * | 7/1970 | Yogus et al. ................ 408/199 |
| 3,755,868 A | | 9/1973 | LaForge et al. |
| 3,775,818 A | * | 12/1973 | Sirola ........................... 407/73 |
| 4,006,995 A | * | 2/1977 | Gruner ....................... 408/157 |
| 4,043,697 A | * | 8/1977 | Eckle ......................... 408/182 |
| 4,087,194 A | * | 5/1978 | Takacs et al. ............... 408/199 |
| 4,101,239 A | | 7/1978 | Wohlhaupter |
| 4,240,770 A | * | 12/1980 | Berstein ....................... 408/83 |
| 4,318,647 A | * | 3/1982 | Erkfritz ...................... 408/153 |
| 4,332,513 A | | 6/1982 | Gowanlock |
| 4,343,576 A | * | 8/1982 | Lagerholm et al. ......... 408/155 |
| 4,595,320 A | * | 6/1986 | Berner et al. ............... 408/182 |
| 4,632,609 A | * | 12/1986 | Johne ......................... 408/197 |
| 4,797,039 A | * | 1/1989 | Bosek .......................... 407/87 |
| 4,848,977 A | * | 7/1989 | Kieninger .................... 407/39 |
| 5,112,164 A | * | 5/1992 | Pano .......................... 407/110 |
| 5,123,787 A | * | 6/1992 | Hunt ........................... 407/39 |
| 5,188,490 A | * | 2/1993 | Muendlein et al. ......... 408/146 |
| 5,330,297 A | * | 7/1994 | Engstrand ................... 408/153 |
| 5,336,026 A | * | 8/1994 | Noggle ....................... 408/147 |
| 5,638,728 A | | 6/1997 | Smith et al. |
| 5,735,649 A | * | 4/1998 | Boscarino et al. .......... 408/153 |
| 5,829,923 A | * | 11/1998 | Nowicki ...................... 407/91 |
| 6,004,080 A | * | 12/1999 | Qvarth et al. ................. 407/36 |
| 6,186,704 B1 | * | 2/2001 | Hale .......................... 407/101 |
| 6,247,878 B1 | * | 6/2001 | Musil et al. ................ 408/1 R |
| 6,270,294 B1 | * | 8/2001 | Sjoo et al. .................. 407/101 |
| 6,814,526 B1 | * | 11/2004 | Shiraiwa et al. ............ 407/110 |
| 6,942,432 B1 | * | 9/2005 | Noggle et al. ................ 407/40 |
| 6,957,936 B1 | * | 10/2005 | Kress ......................... 408/181 |
| 2004/0161311 A1 | * | 8/2004 | Satran et al. ................. 407/46 |

* cited by examiner

*Primary Examiner*—Monica Carter
*Assistant Examiner*—Michael W. Talbot
(74) *Attorney, Agent, or Firm*—Womble Carlyle (57) ABSTRACT

A cutting head for a rotating cutting tool for metal cutting operations. The cutting head has an axially adjustable cartridge which is an integral single piece. A slit divides the cartridge into a clamping portion and a main body portion, the clamping portion being resiliently connected to the main body portion. An insert pocket for retaining a cutting insert is formed by a widening of the slit so that the cutting insert is securely retained in the insert pocket between the main body portion and the clamping portion.

30 Claims, 6 Drawing Sheets

CUTTING HEAD FOR ROTARY CUTTING TOOL

FIELD OF THE INVENTION

The present invention relates to rotary cutting tools in general and in particular to rotary face grooving tools for metal working operations of the type in which replaceable cutting inserts are retained in radially and axially adjustable cartridges.

BACKGROUND OF THE INVENTION

Such rotary cutting tools are well known in the art and are used for producing at least one circular groove of a given width, depth and diameter in a work-piece by means of one or more cutting inserts, as the cutting inserts rotate around an axis of rotation of the cutting tool. In these applications it is often required to vary the axial and radial location of at least one cutting insert in order to form grooves of differing widths, diameter or depth and in addition sometimes at least one edge of the groove has to be chamfered. Such cutting tools, with adjustable cutting inserts generally comprise a tool body to which insert bearing cartridges are secured. One of the known methods for obtaining radial adjustment is to use a cartridge with a serrated mounting surface and a tool body with a corresponding serrated body end surface to which the cartridge is secured. In order to alter the axial location of the insert, the cartridge generally comprises two parts, with one part, to which the cutting insert is attached, slidably adjustable with respect to the other part. Such prior art cartridges are known in which the two parts are slidably connected via axially directed serrated surfaces, the two parts being secured to each other by means of a locking screw. In order to perform axial adjustment the locking screw has to be loosened and then tightened after adjustment, as a consequence of which there is a loss of accuracy of the location of the cutting insert's cutting edge as the two parts move away from each other under the influence of gravity. The cutting inserts are secured in insert pockets of the insert bearing cartridges by means of screws. During machining operations, the cutting inserts are subject to cutting forces and centrifugal forces that are absorbed by the screws. This reduces rigidity and stability of the cutting insert, especially at high rotational speeds, causing inaccuracies in the location of the insert's operative cutting edge resulting in poor machining performance. Such forces can also cause bending and even shearing of the securing screw.

U.S. Pat. No. 4,101,239 discloses a boring tool with cutting inserts secured to insert holders (or blade cutters) that are radially adjustable with respect to a body member. The mounting surface of the holders and the end face of the body member are provided with complementary V-shaped grooves which are aligned in the direction of adjustment of the holders. The cutting inserts are not adjustable in the axial direction of the body member. Moreover, each cutting insert is either brazed in an insert pocket, or secured in therein by means of a screw.

U.S. Pat. No. 3,755,868 discloses an adjustable cutting tool of the type in which a cartridge is mounted on a toolholder and may be adjusted either longitudinally or laterally. More specifically, U.S. Pat. No. 3,755,868 describes an adjustable cartridge boring bar of the type frequently used to machine the inner diameter of metal workpieces. A cutting insert is mounted at the extremity of the cartridge by pin-type means. The longitudinal and lateral adjustment is performed by means of two wedges.

Tools employing grooving inserts which are securely retained in tool holders, generally between a base jaw and a clamping jaw, for producing circular grooves in workpieces are disclosed in U.S. Pat. No. 4,332,513 and U.S. Pat. No. 5,638,728. These tools, however, are non-rotating tools that can only machine a given diameter circular groove that is dictated by the shape of the support blade of the base jaw.

SUMMARY OF THE INVENTION

In one aspect of the present invention, there is provided a cutting head for mounting slidably on a tool shank of a rotary cutting tool for metal cutting operations having an axis of rotation, the cutting head comprising a housing having a recess with an axially adjustable cartridge slidably secured therein, the recess having a base and three sidewalls extending uprightly and axially from the base, two of the sidewalls being parallel and adjacent sidewalls being normal to each other;

the cartridge comprising an integral single piece, having top and bottom opposing parallel surfaces and a peripheral side surface extending therebetween, a slit, extending between two opposing lateral surfaces of the peripheral side surface, extends from the top surface towards the bottom surface dividing the cartridge into a clamping portion and a main body portion, the clamping portion being resiliently connected to the main body portion;

an insert pocket for retaining a cutting insert is formed by a widening of the slit at a region opening out to the top surface, the cutting insert being securely retained in the insert pocket between the main body portion and the clamping portion.

If desired, the insert pocket is adjacent one of the two lateral surfaces.

In accordance with the present invention, a clamping member urges the clamping portion towards the main body portion thereby creating a clamping force to securely retain the cutting insert in the insert pocket.

Typically, the clamping member is a clamping screw that passes through a clamping through hole in the clamping portion and threadingly engages a threaded clamping bore in the main body portion.

Preferably, the clamping through hole in the clamping portion and the threaded clamping bore do not intersect the insert pocket.

Typically, the cutting insert projects from the top surface of the cartridge in a generally axial direction.

In accordance with the present invention, the cartridge is axially adjustable by means of an adjusting screw passing through an adjusting through hole in the housing and threadingly engaged with an axially directed threaded adjusting bore in the main body portion.

Further in accordance with the present invention, the cartridge is held at a given axial location relative to the housing by means of a holding screw passing through a holding through hole in the housing and threadingly engaged with a threaded holding bore in the main body portion, the threaded holding bore being transverse to the threaded adjusting bore.

Preferably, the cartridge is held in abutment with two of the three sidewalls by a biasing member.

Further preferably, the biasing member is a spring biased ball plunger having a ball in abutment with the cartridge, the biasing member being threadingly engaged with a threaded biasing through hole in the housing.

In accordance with the present invention, the housing has a serrated mounting surface in meshing engagement with a serrated end face of the tool shank.

Preferably, the housing is secured to the serrated end face of the tool shank by means of a securing screw passing through.

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 1:
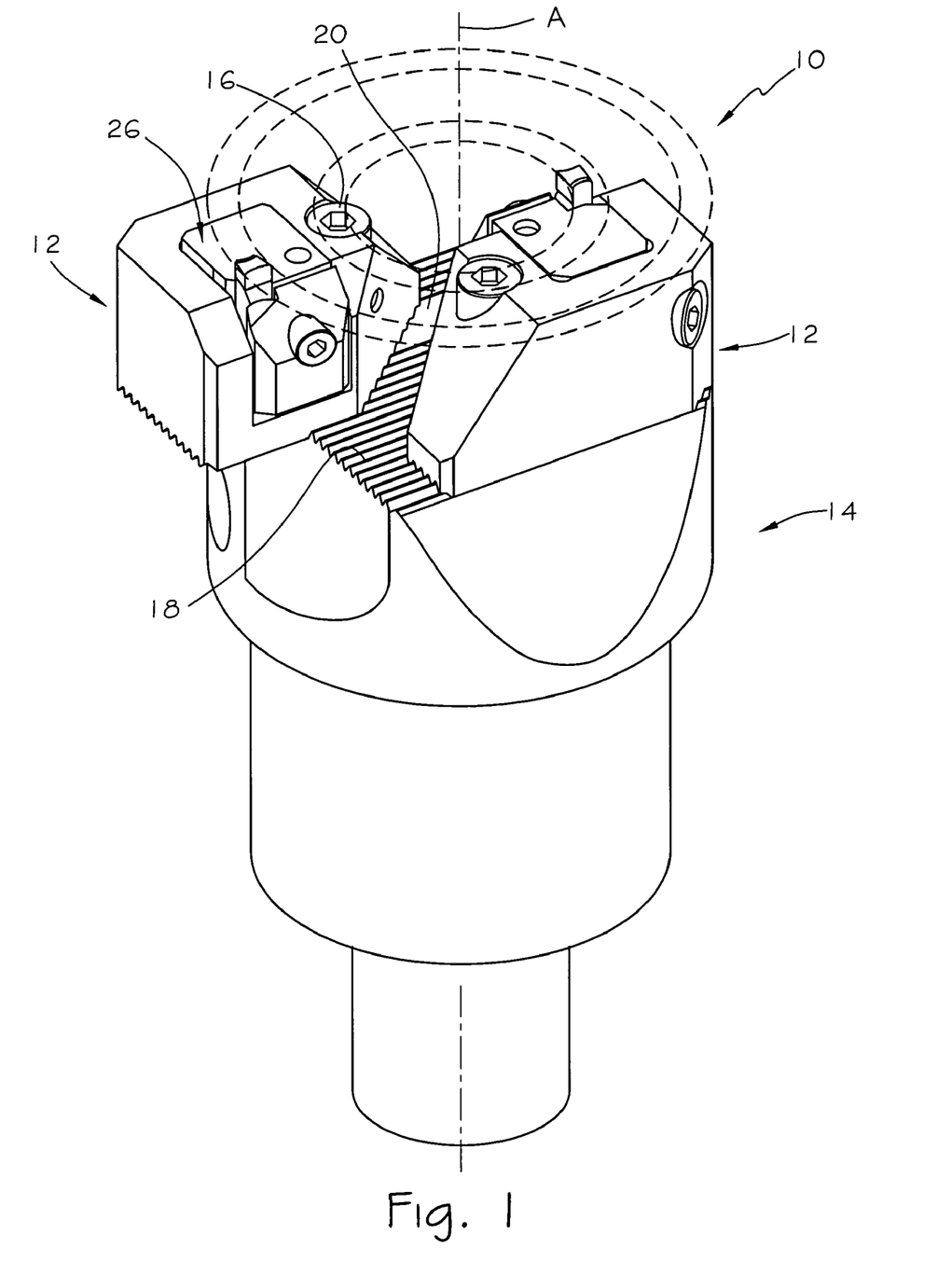
FIG. 1 is a perspective view of a cutting tool according to the present invention.
Figure 2:
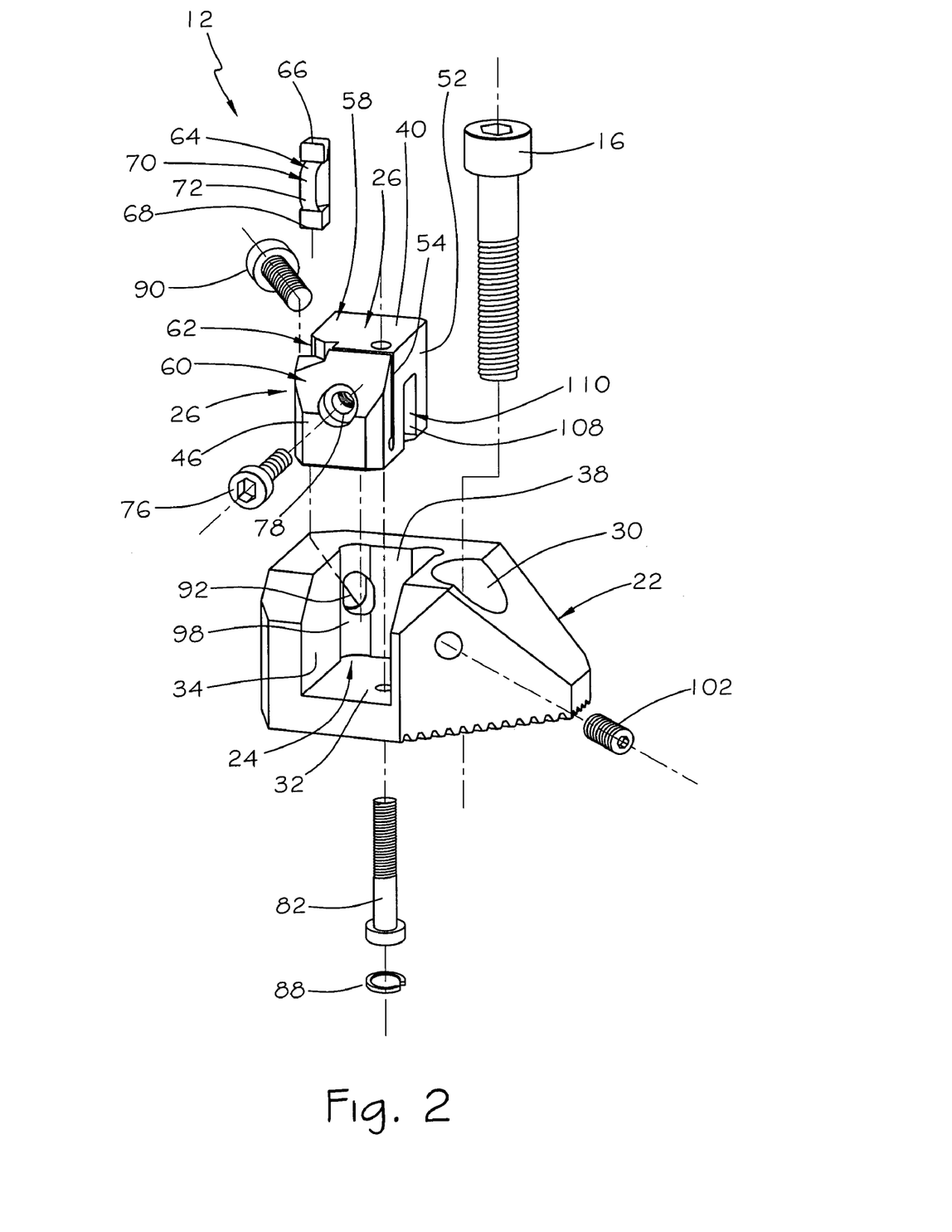
FIG. 2 is a first front perspective exploded view of a housing of the present invention.
Figure 3:
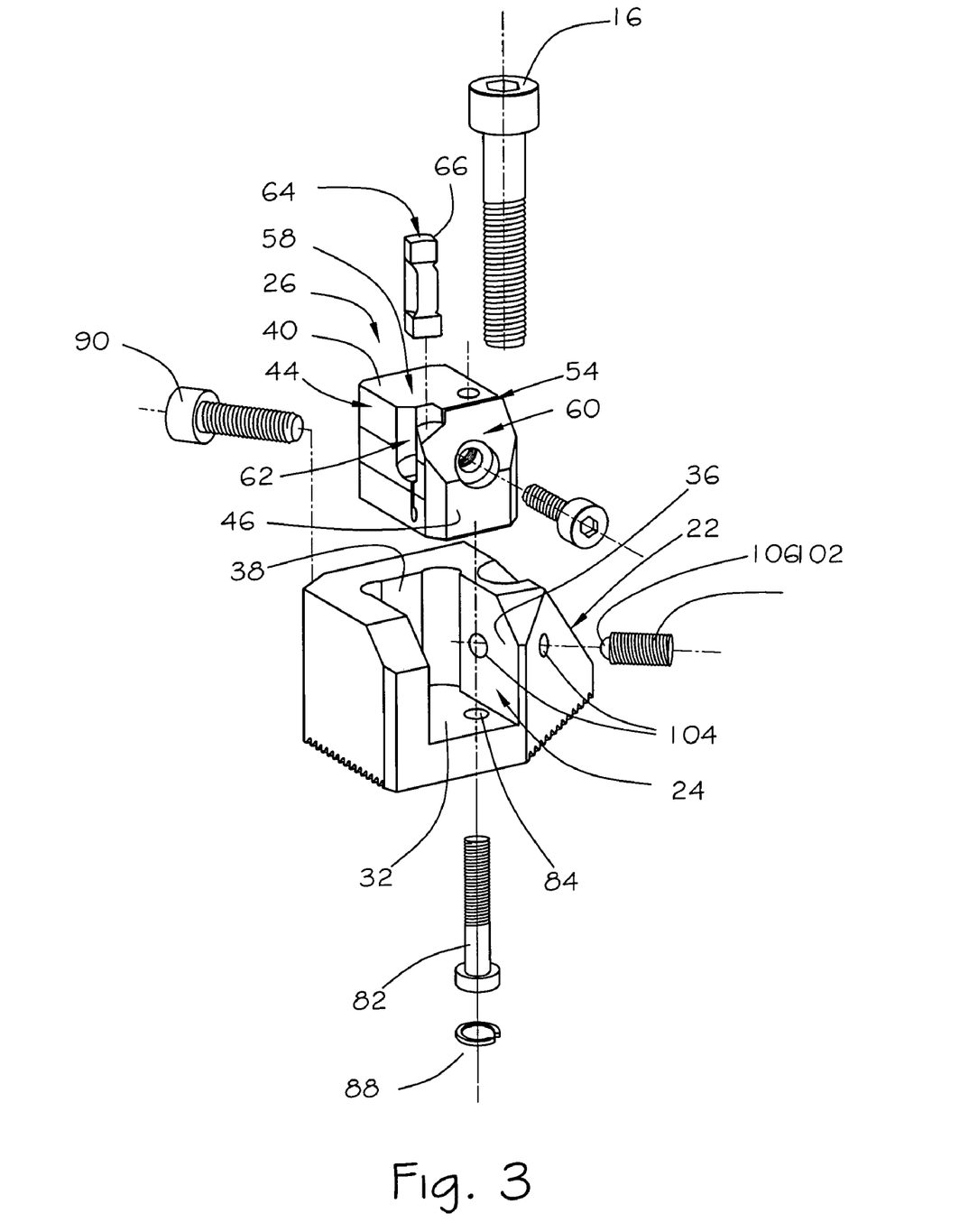
FIG. 3 is a second front perspective exploded view of a housing of the present invention.
Figure 4:
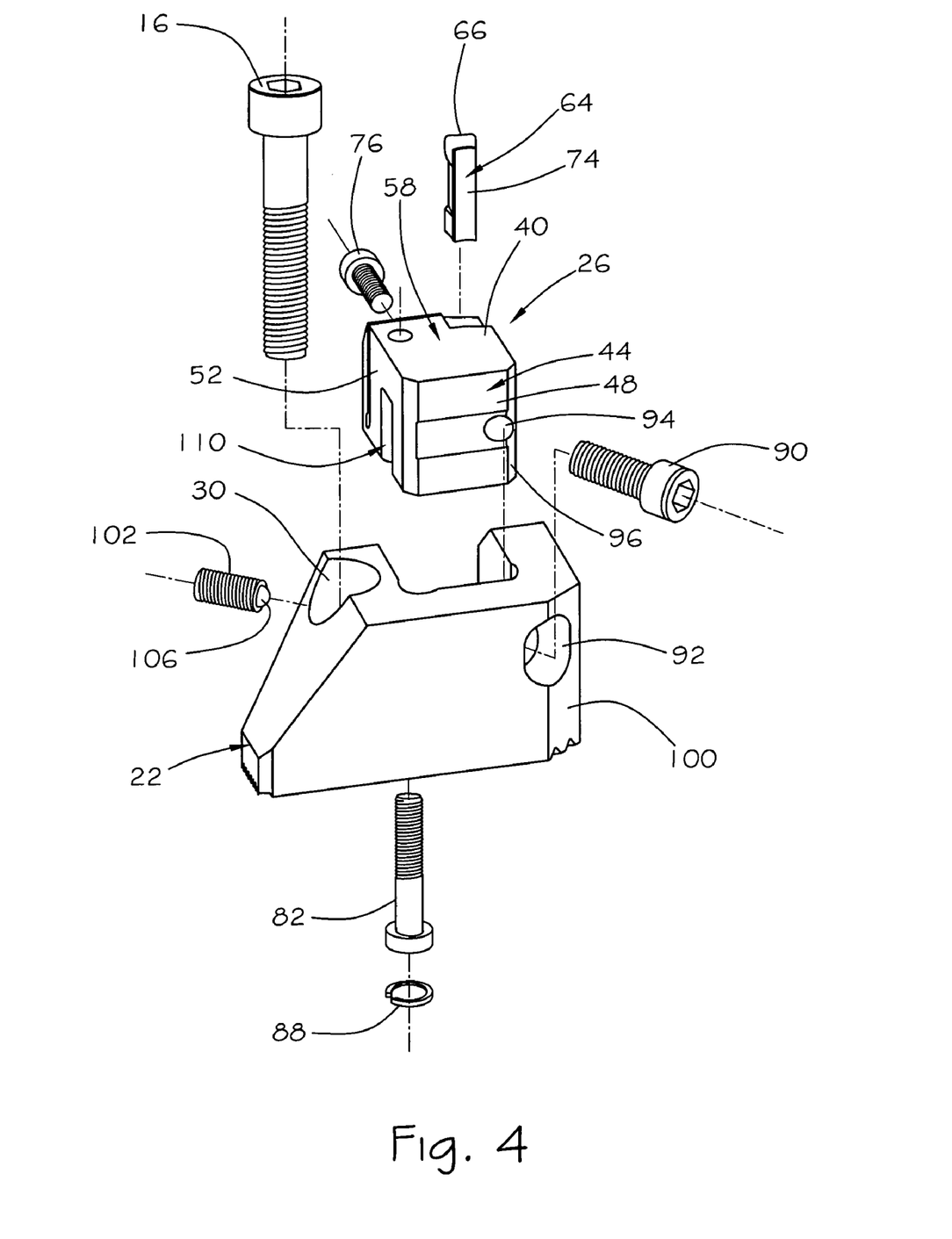
FIG. 4 is a rear perspective exploded view of a housing of the present invention.
Figure 5:
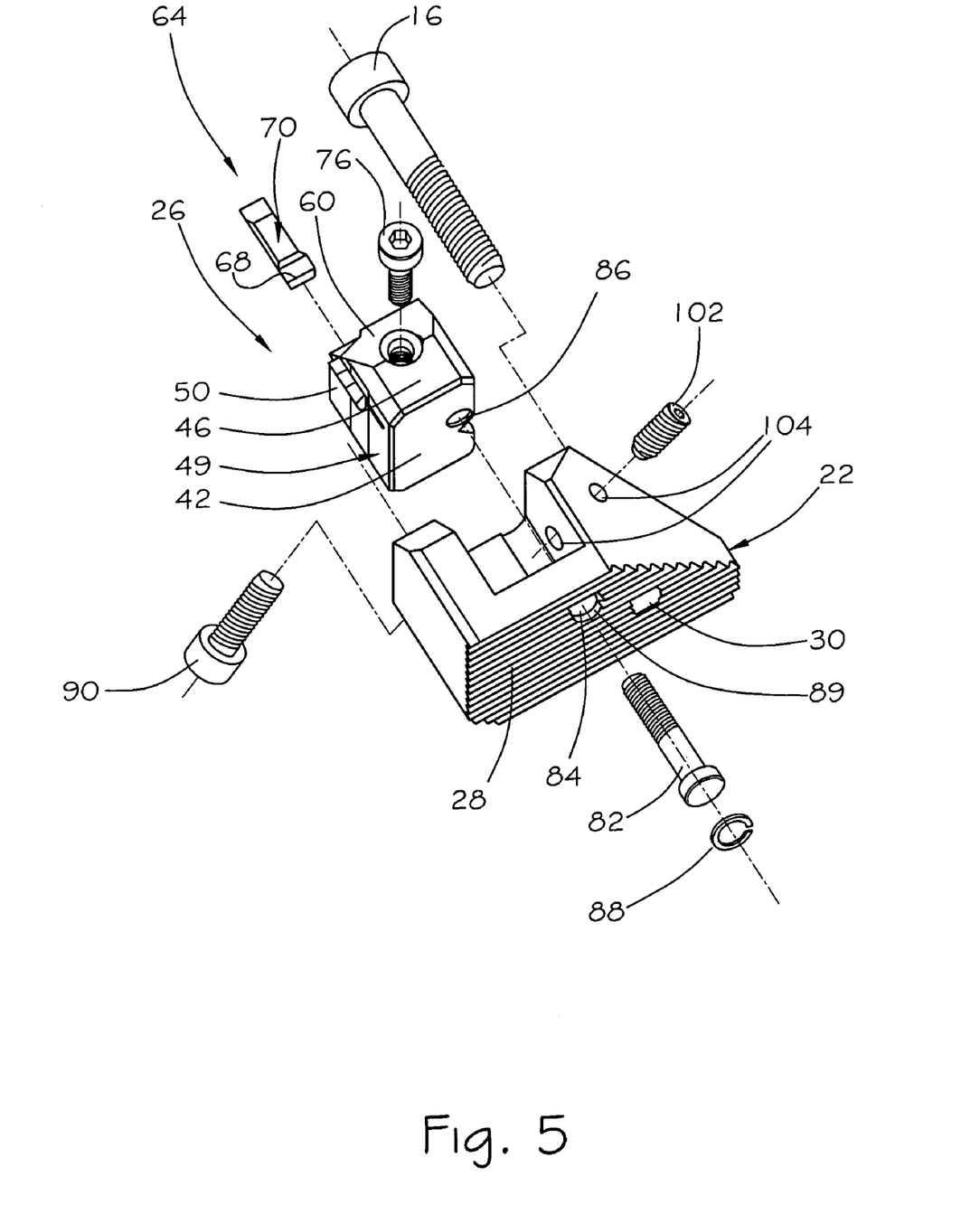
FIG. 5 is a bottom perspective exploded view of a housing of the present invention.
Figure 6:
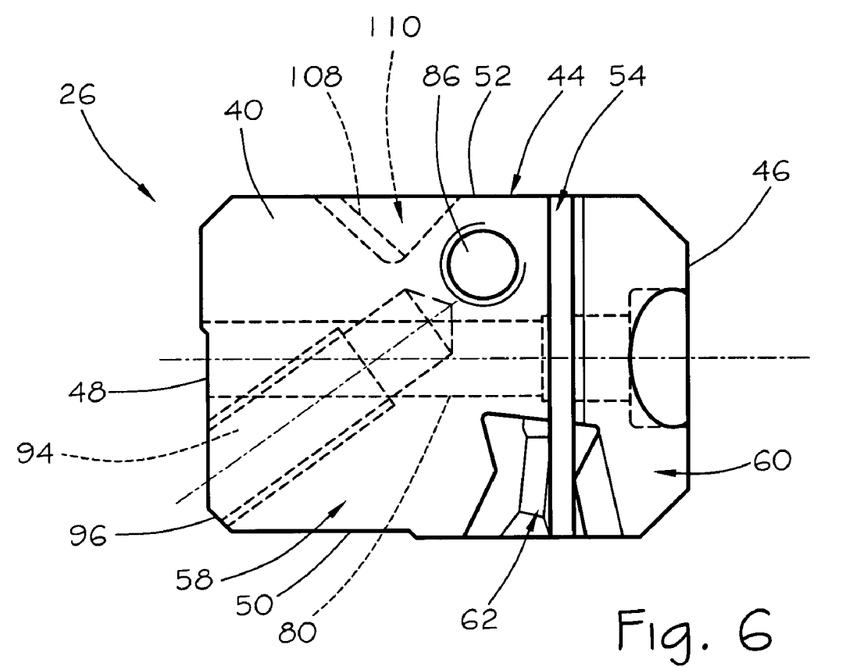
FIG. 6 is a top view of a cartridge of the present invention.
Figure 7:
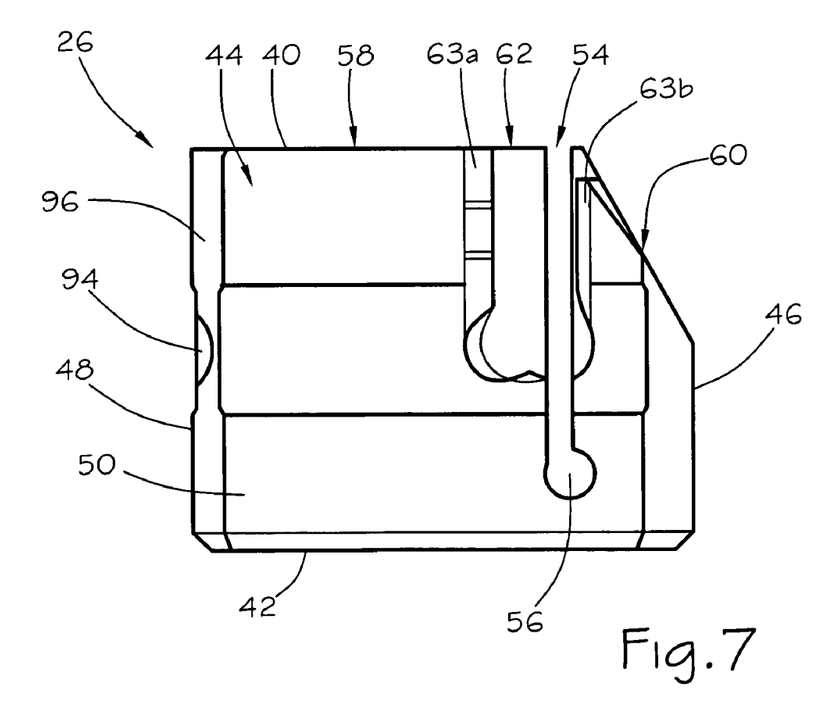
FIG. 7 is a side view of a cartridge of the present invention.

Attention is first drawn to FIG. 1, showing a rotating metal cutting tool 10 having an axis of rotation A and comprising two cutting heads 12, each cutting head 12 secured to a tool shank 14 by means of a locking screw 16. The shank 14 has an end face 18, perpendicular to the axis of rotation A. The end face 18 is serrated across its entire surface with parallel serrations extending across it, and has two slots 20 (only of which one is partially seen in FIG. 1), each extending parallel to the serrations. In each slot 20, there is a locking nut (not seen) into which the locking screw 16 is threaded, clamping the cutting head 12 to the tool shank 14.

The cutting head 12 comprises a housing 22 having a recess 24 and an axially adjustable cartridge 26 slidably secured in the recess 24, a serrated mounting surface 28 and a locking through hole 30 extending axially through the housing 22. The serrated mounting surface 28 of the housing 22 meshes with the serrated end face 18 of the tool shank 14, so that the meshing of the serrations facilitates slidably adjustable positioning of the cutting heads 12, while preventing the cutting heads 12 from moving transversely to the direction in which the serrations extend.

The recess 24 in the housing 22 has a base 32 and three sidewalls extending uprightly and axially from the base. A first sidewall 34 and a second sidewall 36 of the three sidewalls are parallel to each other, and a back wall 38 extends between the first and second sidewalls 34, 36. At least a central portion of the back wall 38 is normal to the sidewalls.

The cartridge comprises an integral single piece, having top and bottom opposing generally parallel surfaces 40, 42 and a peripheral side surface 44 extending therebetween. The peripheral side surface 44 has opposing front and back surfaces 46, 48 and first and second side surfaces 50, 52 parallel to each other and extending between the front and the back surfaces 46, 48. The back surface 48 and the first and second side surfaces 50, 52 are generally normal to the top and bottom surfaces 40, 42. A slit 54 extending between the first and the second side surfaces 50, 52 extends from the top surface 40 towards the bottom surface 42 where it terminates in a circular groove 56, divides the cartridge 26 into a main body portion 58 and a clamping portion 60, the clamping portion 60 being resiliently connected to the main body portion 58. An insert pocket 62 for retaining a cutting insert 64 is formed by a widening of the slit 54 at a region adjacent to the first side surface 50 and opening out to the top surface 40. The insert pocket 62 has two clamping surfaces 63a, 63b, one 63a being part of the main body portion 58, the other 63b being part of the clamping portion 60.

The cutting insert 64 is typically made of a single piece of extremely hard and wear-resistant material such as cemented carbide, either by form-pressing or by injection molding carbide powders in a binder and then sintering. The cutting insert has two cutting edges, an operative cutting edge 66 and a non-operative cutting edge 68, disposed at the extremities of the cutting insert 64. A centrally located clamping section 70 has two opposing abutment surfaces, an upper abutment surface 72 and a lower abutment surface 74. In the cutting insert 64 shown in the figures, the upper abutment surface 72 is restricted to the abutment section, whereas the lower abutment surface 74 extends along the whole length of the cutting insert 64. During a metal cutting operation, metal is removed by the operative cutting edge 66 which projects from the top surface 40 of the cartridge 26 whilst the non-operative cutting edge 68 is located within the insert pocket 62. The shape of the clamping surfaces 63a, 63b of the insert pocket conform to the shape of the abutment surfaces 72, 74 of the cutting insert, and abut them to securely retain the clamping section 70 of the cutting insert 64 between the clamping portion 60 and the main body portion 58 of the cartridge 26.

The clamping portion 60 of the cartridge 26 is urged towards the main body portion 58 by means of a clamping screw 76 which pass through a clamping through hole 78 in the clamping portion 60 and threadingly engages a threaded clamping bore 80 in the main body portion 58 of the cartridge 26, thereby exerting a clamping force on the clamping portion 60 of the cartridge, to securely retain the cutting insert 64 in the cutting insert pocket 62. The clamping through hole 78 in the clamping portion 60 and the threaded clamping bore 80 in the main body portion 48 of the cartridge 26 do not intersect the insert pocket 62, and do not interfere with the cutting insert 64. With this arrangement, the cutting insert 64 is securely and rigidly retained in the insert pocket 62 and cutting and centrifugal forces acting on the cutting insert 64 are absorbed by the clamping and main body portions 60, 58 of the cartridge 26.

To facilitate precise axial location of the operative cutting edge 66 of the cutting insert 64, the axial position of the cartridge 26 is adjusted by an adjusting screw 82 which passes through a generally axially directed adjusting through hole 84 in the housing 22 and threadingly engages a generally axially directed threaded adjusting bore 86 in the main body portion 58 of the cartridge 26. For a right-hand adjusting screw 82, clockwise rotation of the adjusting screw (i.e., "tightening" the adjusting screw) will cause the cartridge 26 to move axially inwards with respect to the housing 22 (i.e., towards the base 32 of the recess 24 of the housing 22), whereas anti-clockwise rotation of the adjusting screw 82 will cause the cartridge 26 to move axially outwards with respect to the housing 22 (i.e., away from the base 32 of the recess 24 of the housing 22). In order to ensure that the head of the adjusting screw 82 is retained within the adjusting through hole 84 in the housing 22, a retaining spring 88 is located in a circular recessed slot 89 in the adjusting through hole 84.

When the required axial position of the cartridge 26 relative to the housing 22 has been achieved, it is held at the required axial location by means of a holding screw 90 which passes through a holding through hole 92 in the housing 22 and threadingly engages a threaded holding bore 94 in the main body portion 58 of the cartridge 26. The threaded holding bore 94 in the main body portion 58 of the cartridge 26 is perpendicular to the threaded adjusting bore 86 and passes through, or adjacent to, a holding corner 96 of the cartridge 26 located between and merging with the back surface 48 and the first side surface 50 of the cartridge 26. The holding through hole 92 in the housing 22 has a shape of a generally axially elongated slot, so as to facilitate axial movement of the holding screw. Therefore, the axial extent of the holding through hole 92 defines the extent of the axial adjustment of the cartridge 26 and consequently of the cutting insert 64 clamped therein. The holding through hole 92 passes through the housing 22, extending between an inner holding corner 98 of the housing 22 and an outer holding corner 100 of the housing, the inner holding corner 98 being located between and merging with the back wall 38 and the first side wall 34 of the recess 24.

In order to avoid wedging of the cartridge 26 during axial adjustment and also to ensure smooth sliding movement of the cartridge 26 with respect to the housing 22, the holding corner 96 of the cartridge 26 is constantly urged towards the inner holding corner 98 of the housing 22 by means of a spring biased ball plunger 102. Consequently, the cartridge 26 is held in abutment with two of the three sidewalls of the housing 22, the abutting surfaces being the first side surface 50 of the cartridge 26 which abuts against the first sidewall 34 of the recess 24, and the back surface 48 of the cartridge 26 which abuts against the back wall 38 of the recess 24.

The spring biased ball plunger 102 is threadingly engaged in a threaded biasing through hole 104 in the housing 22, the threaded biasing through hole 104 being directed generally towards the inner holding corner 98 of the housing 22. A ball 106 at the forward end of the spring biased ball plunger 102 abuts a bearing surface 108 of the cartridge 26. The bearing surface 108 being one of two side surfaces of a substantially V-shaped groove 110 located in the second side surface 52 of the cartridge 26. The bearing surface 108 is generally flat and substantially perpendicular to the biasing through hole 104, when the cartridge 26 is installed in the recess 24.

Although the present invention has been described to a certain degree of particularity, it should be understood that various alterations and modifications could be made without departing from the scope of the invention as hereinafter claimed. For example, the abutment surfaces of the cutting insert shown in the figures have the form of V-shaped grooves, and the clamping surfaces of the insert pocket have the form of complimentary V-shaped protrusions. However, it will be appreciated that the form of the abutment surfaces of the cutting insert and of the clamping surfaces of the insert pocket are not limited to the shapes shown and that any convenient shaped surfaces may be used. Furthermore, the general shape of the cutting insert is not limited to that shown in the figures. Additionally, other embodiments can employ other shapes of the cartridge, or employ other means of exerting a clamping force to urge the clamping portion of the cartridge towards the main body portion of the cartridge, such as levers, clamps or wedges.

What is claimed is:

1. A cutting head for mounting slidably on a tool shank of a rotary cutting tool for metal cutting operations having an axis of rotation, the cutting head comprising a housing having a recess with an axially adjustable cartridge slidably secured therein, the recess having a base and three sidewalls extending uprightly and axially from the base, two of the sidewalls being parallel and adjacent sidewalls being normal to each other;

the cartridge comprising an integral single piece, having top and bottom opposing parallel surfaces and a peripheral side surface extending therebetween, a slit, extending between two opposing lateral surfaces of the peripheral side surface, extends from the top surface towards the bottom surface dividing the cartridge into a clamping portion and a main body portion, the clamping portion being resiliently connected to the main body portion;

an insert pocket for retaining a cutting insert is formed by a widening of the slit at a region opening out to the top surface, the cutting insert being securely retained in the insert pocket between the main body portion and the clamping portion.

2. The cutting head according to claim 1, wherein the insert pocket is adjacent one of the two lateral surfaces.

3. The cutting head according to claim 2, wherein a clamping member urges the clamping portion towards the main body portion thereby creating a clamping force to securely retain the cutting insert in the insert pocket.

4. The cutting head according to claim 3, wherein the clamping member is a clamping screw that passes through a clamping through hole in the clamping portion and threadingly engages a threaded clamping bore in the main body portion.

5. The cutting head according to claim 4, wherein the clamping through hole in the clamping portion and the threaded clamping bore do not intersect the insert pocket.

6. The cutting head according to claim 5, wherein the cutting insert projects from the top surface of the cartridge in a generally axial direction.

7. The cutting head according to claim 1, wherein the cartridge is axially adjustable by means of an adjusting screw passing through an adjusting through hole in the housing and threadingly engaged with an axially directed threaded adjusting bore in the main body portion.

8. The cutting head according to claim 7, wherein the cartridge is held at a given axial location relative to the housing by means of a holding screw passing through a holding through hole in the housing and threadingly engaged with a threaded holding bore in the main body portion, the threaded holding bore being transverse to the threaded adjusting bore.

9. The cutting head according to claim 8, wherein the cartridge is held in abutment with two of the three sidewalls by a biasing member.

10. The cutting head according to claim 8, wherein the biasing member is a spring biased ball plunger having a ball in abutment with the cartridge, the biasing member being threadingly engaged with a threaded biasing through hole in the housing.

11. The cutting head according to claim 1, wherein the housing has a serrated mounting surface in meshing engagement with a serrated end face of the tool shank.

12. The cutting head according to claim 11, wherein the housing is secured, via the serrated mounting surface, to a serrated end face of the tool shank by means of a locking screw passing through.

13. The cutting head according to claim 1, wherein the housing has a serrated mounting surface.

14. The cutting head according to claim 1, wherein the cartridge is held at a given axial location relative to the housing by means of a holding screw passing through a holding through hole in the housing and threadingly engaged with a threaded holding bore in the main body portion.

15. A cutting head comprising:
a housing having a recess provided therein, the recess having a base and three sidewalls extending uprightly and axially from the base, two of the sidewalls being parallel and adjacent sidewalls being normal to each other; and
a cartridge secured in the recess, and comprising:
an integral single piece having top and bottom opposing parallel surfaces and a peripheral side surface extending therebetween;
a slit extending between two opposing lateral surfaces of the peripheral side surface and also extending from the top surface towards the bottom surface dividing the cartridge into a clamping portion and a main body portion, the clamping portion being resiliently connected to the main body portion; and
an insert pocket formed by a widening of the slit at a region opening out to the top surface.

16. The cutting head according to claim 15, further comprising a cutting insert securely retained in the insert pocket between the main body portion and the clamping portion.

17. The cutting head according to claim 16, wherein the cutting insert projects from the top surface of the cartridge in a generally axial direction.

18. The cutting head according to claim 15, wherein the insert pocket is adjacent one of the two lateral surfaces.

19. The cutting head according to claim 15, wherein a clamping member urges the clamping portion towards the main body portion thereby creating a clamping force to securely retain the cutting insert in the insert pocket.

20. The cutting head according to claim 19, wherein the clamping member is a clamping screw that passes through a clamping through hole in the clamping portion and threadingly engages a Threaded clamping bore in the main body portion.

21. The cutting head according to claim 20, wherein the clamping through hole in the clamping portion and the threaded clamping bore do not intersect the insert pocket.

22. The cutting head according to claim 15, wherein the cartridge is held at a given axial location relative to the housing by means of a holding screw passing through a holding through hole in the housing and threadingly engaged with a threaded holding bore in the main body portion.

23. A cutting head comprising:
a housing having a recess provided therein; and
a cartridge secured in the recess, and comprising:
an integral single piece having top and bottom opposing parallel surfaces and a peripheral side surface extending therebetween;
a slit extending between two opposing lateral surfaces of the peripheral side surface and also extending from the top surface towards the bottom surface dividing the cartridge into a clamping portion and a main body portion, the clamping portion being resiliently connected to the main body portion; and
an insert pocket formed by a widening of the slit at a region opening out to the top surface;
wherein the cartridge is axially adjustable by means of an adjusting screw passing through an adjusting through hole in the housing and threadingly engaged with an axially directed threaded adjusting bore in the main body portion.

24. The cutting head according to claim 23, wherein the cartridge is held at a given axial location relative to the housing by means of a holding screw passing through a holding through hole in the housing and threadingly engaged with a threaded holding bore in the main body portion, the threaded holding bore being transverse to the threaded adjusting bore.

25. A cutting head comprising:
a housing having a recess provided therein, the recess having a base and three sidewalls extending uprightly and axially from the base, two of the sidewalls being parallel and adjacent sidewalls being normal to each other; and
a cartridge secured in the recess, and comprising:
an integral single piece having ton and bottom opposing parallel surfaces and a peripheral side surface extending therebetween;
a slit extending between two opposing lateral surfaces of the peripheral side surface and also extending from the ton surface towards the bottom surface dividing the cartridge into a clamping portion and a main body portion, the clamping portion being resiliently connected to the main body portion; and
an insert pocket formed by a widening of the slit at a region opening out to the top surface;
wherein the cartridge is held in abutment with two of the three sidewalls by a biasing member.

26. The cutting head according to claim 25, wherein the biasing member is a spring biased ball plunger having a ball in abutment with the cartridge, the biasing member being threadingly engaged with a threaded biasing through hole in the housing.

27. A rotary metal cutting tool comprising:
a tool shank having an axis of rotation;
at least one cutting head comprising:
a housing having a recess provided therein, the recess having a base and three sidewalls extending uprightly and axially from the base, two of the sidewalls being parallel and adjacent sidewalls being normal to each other; and
a cartridge secured in the recess, and comprising:
an integral single piece having top and bottom opposing parallel surfaces and a peripheral side surface extending therebetween;
a slit extending between two opposing lateral surfaces of the peripheral side surface and also extending from the top surface towards the bottom surface dividing the cartridge into a clamping portion and a main body portion, the clamping portion being resiliently connected to the main body portion; and
an insert pocket formed by a widening of the slit at a region opening out to the top surface; and
a cutting insert retained in the insert pocket between the main body portion and the clamping portion;
wherein the housing is secured to the tool shank.

28. The rotary metal cutting tool according to claim 27, wherein:
the housing has a serrated mounting surface;
the tool shank has a serrated end face; and
the serrated mounting surface of the housing meshes with the serrated end surface of the tool shank.

29. The rotary metal cutting tool according to claim 28, wherein the housing is secured to the tool shank by means of a locking screw.

30. The rotary metal cutting tool according to claim 27, comprising a plurality of cutting heads, each cutting head having a housing provided with a serrated mounting surface that meshes with a serrated end surface of the tool shank.

* * * * *